US011137155B2

(12) United States Patent
Bourne

(10) Patent No.: US 11,137,155 B2
(45) Date of Patent: Oct. 5, 2021

(54) FRAME FOR AN EVAPORATIVE COOLER

(71) Applicant: INTEGRATED COMFORT, INC., West Sacramento, CA (US)

(72) Inventor: Richard Curtis Bourne, Davis, CA (US)

(73) Assignee: INTEGRATED COMFORT, INC., West Sacramento, CA (US)

( * ) Notice: Subject to any disclaimer, the term of this patent is extended or adjusted under 35 U.S.C. 154(b) by 0 days.

(21) Appl. No.: 16/967,114

(22) PCT Filed: Feb. 6, 2019

(86) PCT No.: PCT/US2019/016856
§ 371 (c)(1),
(2) Date: Aug. 3, 2020

(87) PCT Pub. No.: WO2019/157059
PCT Pub. Date: Aug. 15, 2019

(65) Prior Publication Data
US 2020/0363083 A1 Nov. 19, 2020

Related U.S. Application Data

(60) Provisional application No. 62/627,637, filed on Feb. 7, 2018.

(51) Int. Cl.
*F24F 6/04* (2006.01)
*F24F 6/02* (2006.01)
(Continued)

(52) U.S. Cl.
CPC .................. *F24F 6/04* (2013.01); *F24F 6/02* (2013.01); *F24F 13/20* (2013.01); *F25D 7/00* (2013.01); *F25D 23/006* (2013.01)

(58) Field of Classification Search
CPC ...... F24F 6/04; F24F 6/02; F24F 13/20; F24F 5/0035; F24F 6/14; F25D 7/00;
(Continued)

(56) References Cited

U.S. PATENT DOCUMENTS 4,080,410 A * 3/1978 Goettl .................... B01D 1/00
261/97
4,389,352 A * 6/1983 Bohanon, Sr. ............ F24F 6/04
261/106

(Continued)

OTHER PUBLICATIONS

International Search Report and Written Opinion issued in PCT/US2019/016856 dated Apr. 24, 2019 (9 pages).

(Continued)

*Primary Examiner* — Frantz F Jules
*Assistant Examiner* — Martha Tadesse
(74) *Attorney, Agent, or Firm* — Northstar Law Group; Thomas J. Bassolino

(57) ABSTRACT

A frame for an evaporative cooler includes a bottom channel including a bottom panel and two bottom-side panels, a top channel including a top panel and two top-side panels, and a pair of side channels disposed between, and engaged with, each of the bottom channel and the top channel. The side channels may include a vertical side panel, a flanged bottom, a flanged top, and a pair of flanged sides, where the flanged bottom is engaged with the bottom panel, the flanged top is engaged with the top panel, and each of the pair of flanged sides is engaged with a bottom-side panel of the bottom channel and a top-side panel of the top channel.

20 Claims, 3 Drawing Sheets

(51) Int. Cl.
*F25D 23/00* (2006.01)
*F25D 7/00* (2006.01)
*F24F 13/20* (2006.01)

(58) Field of Classification Search
CPC .......... F25D 23/006; F25D 23/12; F25D 3/00; F25D 23/00; F28D 5/00; F28D 5/02; B01D 1/22; F28C 3/08; F25B 39/02
See application file for complete search history.

(56) References Cited

U.S. PATENT DOCUMENTS

| | | | | |
|---|---|---|---|---|
| 5,857,350 | A * | 1/1999 | Johnson | F24F 5/0035 62/314 |
| 6,206,348 | B1 * | 3/2001 | Imsdahl | F02C 7/143 261/103 |
| 6,367,277 | B1 * | 4/2002 | Kinkel | F24F 5/0035 62/310 |
| 6,409,157 | B1 * | 6/2002 | Lundin | F24F 6/04 261/112.2 |
| 7,014,174 | B2 * | 3/2006 | Roberts | F24F 13/20 261/29 |
| 7,021,078 | B2 * | 4/2006 | Kucera | F28F 25/04 62/310 |
| 7,900,469 | B2 * | 3/2011 | Gildersleeve | F24F 6/04 62/310 |
| 9,091,450 | B2 * | 7/2015 | Ritchie | F28D 5/00 |
| 2010/0170776 | A1 * | 7/2010 | Ehrenberg | B01D 63/085 202/168 |

OTHER PUBLICATIONS

IN02059MN2015 A (Hytem Co., LTD) May 27, 2016 (May 27, 2016) (33 pages).

* cited by examiner

FRAME FOR AN EVAPORATIVE COOLER

CROSS-REFERENCE TO RELATED APPLICATIONS

The present invention is filed under 35 U.S.C. § 371 as the U.S. national phase of International Application No. PCT/US2019/016856, filed on Feb. 6, 2019, which designated the U.S. and which claims priority to U.S. Provisional Application No. 62/627,637 filed on Feb. 7, 2018, the entire contents of each of which are hereby incorporated by reference

FIELD

The present disclosure generally relates to devices, systems, and methods for a frame, e.g., for evaporative coolers and pre-coolers.

BACKGROUND

Evaporative coolers are often used to cool buildings or to augment the cooling of buildings and processes in dry and moderately dry climates. In commercial applications, evaporative pre-coolers are increasingly used to improve the efficiency of vapor-compression cooling systems through their placement upstream of the condensing coil(s). Newer, more cost-effective evaporative coolers may use "rigid media" instead of (the more traditional) woven wood fiber evaporative media. The rigid media may be produced as rectangular blocks built up from glued, cross-corrugated sheets of treated paper. The media blocks are typically 12" to 24" wide, by 4" to 12" thick, by 36" to 84" high. In use, airflow may proceed through the thickness of the media block in a repeated "up and down" path, directed by opposed corrugations. Media blocks may be easily cut to desired dimensions for a particular cooler.

Evaporative cooling may be accomplished as water distributed on top of the media blocks flows gravitationally downward to wet the media. Air flowing on its extended course through the media may pick up moisture such that, in typical operation, the airstream is nearly saturated when it exits the media.

The media blocks may be arranged side-by-side and may be held in position in a frame, e.g., sheet metal or plastic frames. In most aspects, the media blocks should be held relatively securely in position for optimal performance and durability. If the media blocks are out of position, they may allow air and/or water to stray from its intended path and degrade performance. Also, wind or seismic forces should generally not be able to dislodge the media blocks from the enclosure. However, the media blocks may need to be removed and re-installed for routine service and occasional replacement. Typical evaporative cooler enclosures, and pre-cooler frames, may be designed with media removal from the top, as seen for example in U.S. Pat. No. 7,021,078, which is hereby incorporated by reference in its entirety. In this design, the media housing tilts out, the top (with its water feed system) is removed, and the media can then be lifted out for cleaning or replacement.

There remains a need for improved frames, e.g., for evaporative coolers and pre-coolers.

SUMMARY

In an aspect, a frame for an evaporative cooler includes a bottom channel including a bottom panel and two bottom-side panels, a top channel including a top panel and two top-side panels, and a pair of side channels disposed between, and engaged with, each of the bottom channel and the top channel. The side channels may include a vertical side panel, a flanged bottom, a flanged top, and a pair of flanged sides, where the flanged bottom is engaged with the bottom panel, the flanged top is engaged with the top panel, and each of the pair of flanged sides is engaged with a bottom-side panel of the bottom channel and a top-side panel of the top channel.

These and other features, aspects, and advantages of the present teachings will become better understood with reference to the following description, examples, and appended claims.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein. In the drawings, like reference numerals generally identify corresponding elements.

DETAILED DESCRIPTION

Figure 1:
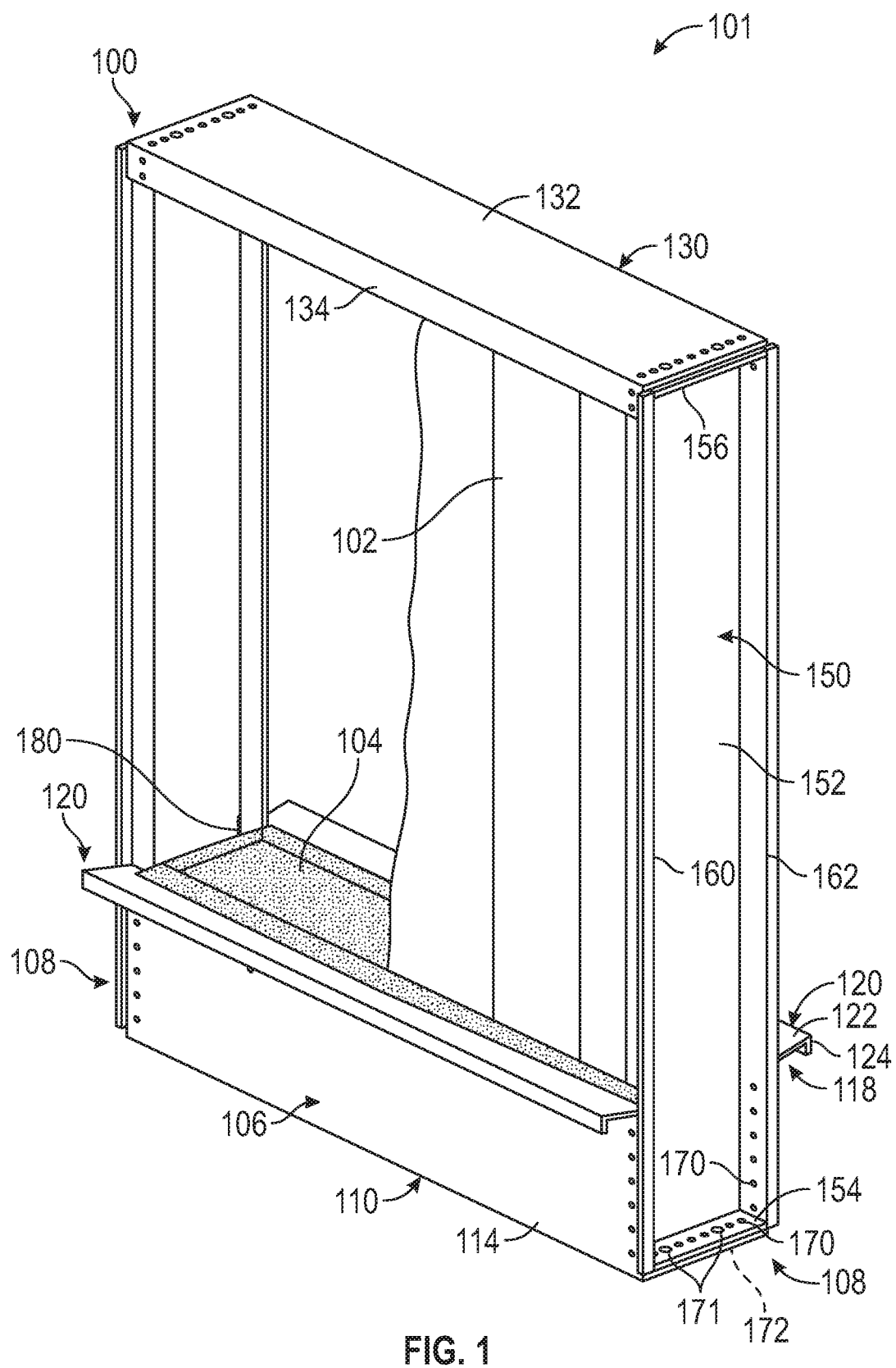
FIG. 1 is a perspective view of a frame for an evaporative pre-cooler, in accordance with a representative embodiment.

The embodiments will now be described more fully hereinafter with reference to the accompanying figures, in which preferred embodiments are shown. The foregoing may, however, be embodied in many different forms and should not be construed as limited to the illustrated embodiments set forth herein. Rather, these illustrated embodiments are provided so that this disclosure will convey the scope to those skilled in the art.

All documents mentioned herein are hereby incorporated by reference in their entirety. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately" or the like, when accompanying a numerical value, are to be construed as indicating a deviation as would be appreciated by one of ordinary skill in the art to operate satisfactorily for an intended purpose. Similarly, words of approximation such as "about," "approximately," or "substantially" when used in reference to physical characteristics, should be understood to contemplate a range of deviations that would be appreciated by one of ordinary skill in the art to operate satisfactorily for a corresponding use, function, purpose, or the like. Ranges of values and/or numeric values are provided herein as examples only, and do not constitute a limitation on the scope of the described embodiments. Where ranges of values are provided, they are also intended to include each value within the range as if set forth individually, unless expressly stated to the contrary. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

In the following description, it is understood that terms such as "first," "second," "top," "bottom," "up," "down," and the like, are words of convenience and are not to be construed as limiting terms unless specifically stated to the contrary.

The present teachings may generally include devices, systems, and methods for a frame, e.g., for evaporative coolers and pre-coolers. In this manner, the present teachings may generally respond to a need for lower-cost, more easily serviced rigid-media evaporative cooler frames that are also lighter in weight and facilitate relatively easy shipping and handling.

That is, in evaporative coolers, media blocks may be arranged side-by-side, where they are held in position in frames, e.g., made from metal or plastic. The frames may be made from bottom, top, and side channels that are joined at the corners thereof. The bottom channels may be deeper, and may be configured to make watertight joints with the side channels so that they essentially can become reservoirs. In many designs, water that has drained from the blocks is collected in the reservoir, where it is then recirculated upward by a pump. In these designs, the blocks may be supported on a screen above the bottom of the reservoir, and a refill mechanism may be used to replenish the reservoir, e.g., to replace evaporated water. In other designs, incoming water flow from a pressurized source is carefully controlled to keep the media wet without an appreciable amount that drains from the bottom. In these designs, a pump, a screen, or a deep reservoir may not be required, but control of evaporative effectiveness and water quality can be more difficult.

In the art of pre-coolers, stainless steel may be a frame material of choice because of its strength and durability, and because it may not require any additional coatings. Also, frame corners may be continuously welded for strength and watertight performance. However, beyond the aforementioned, there may be little advancements regarding ways to join corner frames of rigid media evaporative pre-coolers. A way to understand limitations in the art is to review available product lines. Some examples include the Munters EPCC design shown online at https://www.munters.com/globalassets/inriver/resources/airt-epcc-productsheet-eng.pdf, as well as the Cool Edge (http://cooledge-precoolers.com/photos.htm) and HydEvap (http://www.haveacoolday.com/products/hydrevap-precoolers/hydrevap-literature) products, where each of the foregoing disclosures is hereby incorporated by reference in its entirety.

Thus, existing rectangular stainless-steel assemblies may have a very clean look, with inward-turned channels for all frame members, and welded corners. They may be fabricated of high quality materials and typically can be expected to outlast the rooftop units to which they are attached. However, they may have liabilities that can significantly limit their success in the marketplace—maintainability, high cost, manufacturing, and handling—where each of these liabilities is discussed below.

Maintainability—like other "open water" systems, evaporative cooling systems often require considerable maintenance. Regular removal, cleaning, and re-insertion of the media blocks are typically essential to effective long-term performance. With their inward-bent side frame members, pre-coolers in the art often complicate media removal and insertion. The inward-bent side channels may also compromise performance by reducing airflow along the outside edges of the media array.

High Cost—pre-cooling economics are tenuous in many climates. Welded corners and simple channels often require relatively thick stainless steel for adequate strength, and considerable labor may be required to weld and polish the joints. Welding stainless steel thinner than 16-gauge into watertight corners can be slow and challenging. Stainless steel has obvious durability advantages but at a high cost, especially when 18-gauge or thicker stainless steel is used. Large plastic frames with fused corners can be more economical, but may lack the strength, durability, and marketability of stainless-steel frames.

Streamlined Manufacturing—pre-coolers are typically custom-sized for specific heating, ventilation, and air-conditioning (HVAC) equipment, and so manufacturing should be easily adaptable to varying frame sizes. Tooling for holding frame members while corners are joined can be expensive, and smooth corners can limit opportunities for building alignment features into the frame members.

Handling Challenges—market opportunities for condenser and chiller pre-coolers may involve multiple units on large roofs, but the "smooth exterior ends" in the art can prevent easy attachment at either the top (e.g., for lifting onto trucks, trailers, and roofs) or the bottom (e.g., for interconnecting multiple units so they are stable during handling, lifting, and temporary storage in warehouses and on roofs).

The present teachings may generally respond to the aforementioned issues associated with frames in the art. Specifically, the present teachings may include a frame with a relatively simple framework that may provide advantages in strength, manufacturability, handling, and maintainability compared to other frames. For example, using side channels that have outward-turned edges and flanges, the present teachings may facilitate relatively economical spot-welding at frame corners, relatively easy media insertion and removal, relatively easy lifting from the top of the frame, and relatively easy holding to anchoring assemblies (e.g., plates and planks) at the bottom and/or top of the frame. Additional corner bends may further help align parts during manufacturing or setup, and can also increase strength (e.g., side channel strength) and allow for the use of a relatively thin material to reduce cost. Spot-welding, e.g., with caulk sealant, can also or instead eliminate challenges associated with continuous welding of relatively thin stainless steel.

The present teachings may thus include a relatively strong rigid media evaporative cooler frame that significantly advances the state-of-the-art. By way of example, some advantages of the present teachings may include: lower material costs; cost savings in manufacturing; relatively lighter weight and easier handling; relatively easy pairing of multiple units for stable storage and lifting; and relatively easy media removal from the front.

Thus, described herein are devices, systems, and methods for a frame for HVAC equipment such as an evaporative pre-cooler. It will be understood that while the exemplary embodiments herein may emphasize a frame for an evaporative pre-cooler, the principles of the present teachings may be adapted to a wide variety of HVAC equipment, and in particular, evaporative coolers and the like. Thus, any reference herein to an evaporative pre-cooler is intended to refer to any and all such a variety of HVAC equipment, and thus terms such as "evaporative pre-cooler," "evaporative cooler," "cooler," and the like are intended to refer to any and all such a variety of HVAC equipment, unless a different meaning is explicitly stated or otherwise clear from the context.

FIG. 1 is a perspective view of a frame 100 for an evaporative cooler 101 (e.g., an evaporative pre-cooler), in accordance with a representative embodiment. The frame 100 may include a plurality of features that facilitate relatively easy assembly (and disassembly, if necessary), relatively efficient use of materials and engagement features, relatively easy transport, relatively easy stacking or grouping with other frames 100, enhanced strength, and so on. FIG. 1 shows the frame 100 with a cutaway of rigid media 102 and a bottom support 104 for the rigid media 102, which may include a screen or the like to facilitate a fluid pathway between the area of the rigid media 102 and a fluid reservoir 116 (e.g., having a sump, a drain, or the like). The view in FIG. 1 emphasizes various features of the present teachings, e.g., including out-turned edges of various components that can allow for relatively easy spot-welding of the frame 100 from the outside, and can establish mating tabs that can be used to align, hold, and lift the frame 100 and the evaporative cooler 101, generally. Thus, it will be understood that a variety of the aforementioned out-turned edges of various components of the frame 100 may be emphasized in the drawings for clarity. In other words, thicknesses are shown for many of these out-turned edges and the like for clarity, where, in actual use, such out-turned edges and the like may simply be formed of bent or folded sheet metal. That is, the various components or channels of the frame 100 may be formed of a single piece of material (e.g., sheet metal) that is manipulated into a desired shape for configuring the frame 100, including the formation of the aforementioned out-turned edges and the like. In other aspects, the out-turned edges and the like are welded or otherwise adjoined to a separate piece of material for forming a component or channel of the frame 100.

In general, the frame 100 may include a plurality of pieces (generally referred to herein as "channels") that fit together to form the structure and shape of the frame 100. That is, these pieces may be referred to herein as "channels" because they may fit together to support blocks of rigid media 102 of the evaporative cooler 101, where each piece forms or defines a channel supporting one or more of the surfaces of the blocks of rigid media 102 by containing at least a portion of the surface within a cutout, void, or other mechanical engagement. In this manner, the frame 100 may include a bottom channel 110, a top channel 130, and a pair of side channels 150.

Figure 2:
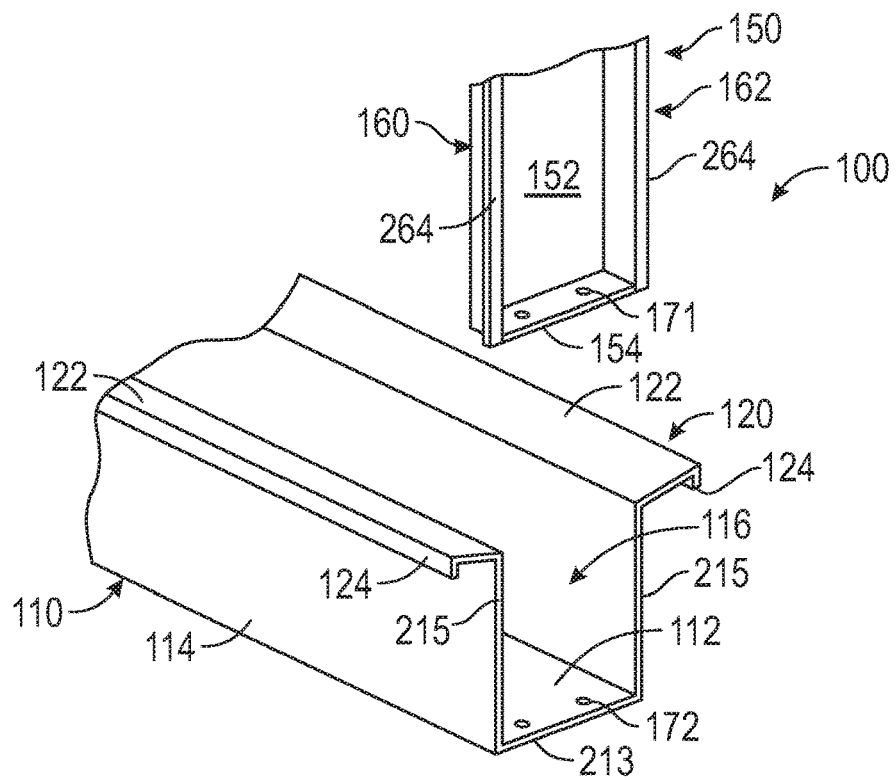
FIG. 2 is an exploded view showing a bottom portion of a frame for an evaporative pre-cooler, in accordance with a representative embodiment.

As best shown in FIG. 2, the bottom channel 110 may include a bottom panel 112 that generally forms a base of the frame 100, and thus the bottom panel 112 may also form a base for the evaporative cooler 101. The bottom channel 110 may further include two bottom-side panels 114 extending upward from the bottom panel 112 thus forming sides of the bottom channel 110, or sides of the frame 100 (i.e., the front side 106 and back side of the frame 100) at a bottom portion thereof.

Figure 3:
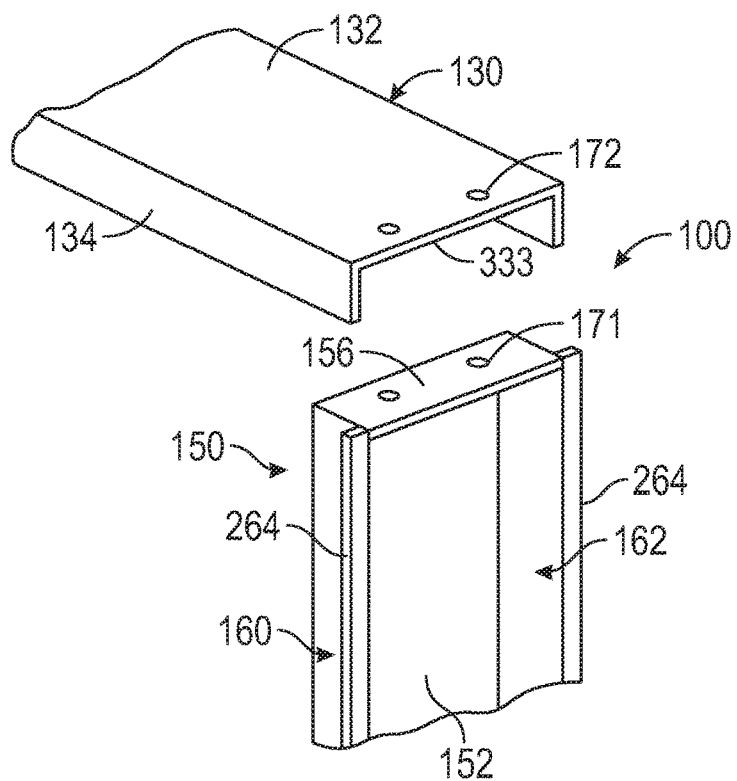
FIG. 3 is an exploded view showing a top portion of a frame for an evaporative pre-cooler, in accordance with a representative embodiment.

Turning back to FIG. 1 (and as also shown in FIG. 3), the top channel 130 may include a top panel 132 that generally forms a top of the frame 100, and thus the top panel 132 may also form a top for the evaporative cooler 101. The top channel 130 may further include two top-side panels 134 extending downward from the top panel 132 thus forming sides of the top channel 130, or sides of the frame 100 (i.e., the front side 106 and back side of the frame 100) at a top portion thereof.

The bottom channel 110 and the top channel 130 may be connected via one or more side channels 150 generally disposed at the ends 108 (or sides, as referred to herein) of the frame 100. For example, and as shown in FIG. 1, the frame 100 may include a pair of side channels 150 disposed between, and engaged with, each of the bottom channel 110 and the top channel 130 to form the frame 100 of the evaporative cooler 101. It will be understood that the bottom channel 110 may define a reservoir 116, or the bottom channel 110 may form a portion of the reservoir 116 of an evaporative cooler 101. Stated otherwise, in certain aspects, the bottom channel 110 is structurally configured to serve as a liquid reservoir 116 for the evaporative cooler 101.

The side channels 150 may each include a vertical side panel 152 with flanged features protruding at the perimeter of the vertical side panel 152. For example, the vertical side panel 152 may include a flanged bottom 154 and a flanged top 156 disposed opposite one another and each extending outward from the vertical side panel 152. The flanged bottom 154 of each side channel 150 may be engaged with the bottom panel 112 at an end 108 of the frame 100 (which may coincide with the distal end of the bottom panel 112 as well). Similarly, the flanged top 156 of each side channel 150 may be engaged with the top panel 132 at an end 108 of the frame 100 (which may coincide with the distal end of the top panel 132 as well).

The vertical side panel 152 may also or instead include a pair of flanged sides (a flanged first side 160 and a flanged second side 162) disposed opposite one another and each extending outward from the vertical side panel 152. Each of the pair of flanged sides of the side channels 150 may be engaged with a bottom-side panel 114 of the bottom channel 110 and a top-side panel 134 of the top channel 130.

Thus, as described and shown herein, the assembled evaporative cooler 101 may generally include a frame 100 that is four-sided and substantially rectangular. The frame 100 may be made from a bottom channel 110, a top channel 130, and side channels 150, e.g., with the channels joined together (e.g., at the corners using spot welds 170 or the like). The spot welds 170 may be spaced about two-inches apart, except for closer spacing at the corners, e.g., the top corners, but other spacing is also or instead possible. As discussed above, FIG. 1 also shows cutaways of the rigid media 102 and a bottom support 104 (e.g., a screened plate) that supports the rigid media 102, e.g., along the top edges of the bottom channel 110. These components are shown for completeness but may not be a focus of the present teachings.

Turning back to the bottom channel 110, a top portion 118 thereof may include a splash ledge 120. More specifically, in certain implementations, a top portion 118 of each of the two bottom-side panels 114 of the bottom channel 110 may include the splash ledge 120. The splash ledge 120 may include an inclined surface 122, which is structurally configured to direct liquid toward the bottom panel 112, e.g., to catch drips off of the evaporative rigid media 102 and return any captured droplets back to a fluid reservoir 116. The splash ledge 120 may include downturned edges 124 at a terminal portion thereof. The splash ledge 120 may also or instead be structurally configured (e.g., sized and shaped) to support an edge of the bottom support 104 (or a portion thereof) that holds the rigid media 102 in place in the evaporative cooler 101.

Turning back to the flanged portions of the side channels 150, in general, the flanged portions may be structurally configured to mate or engage with portions of another channel, e.g., the bottom channel 110, the top channel 130, or both. For instance, in certain implementations, and as best shown in FIGS. 2 and 3, each of the pair of flanged sides (e.g., the flanged first side 160 and the flanged second side 162) may include an outward-turned edge 264 serving as a "positioning stop" for, and/or enveloping, at least a portion of one or more of the bottom-side panels 114 (see FIG. 2) and the top-side panels 134 (see FIG. 3). These features (e.g., the outward-turned edges 264 and the like) may also add strength and can be particularly valuable for positioning the adjoining channels (the bottom channel 110, the top channel 130, and the side channel 150) during assembly, as will be further discussed.

As shown in each of FIGS. 1-3, the frame 100 may include one or more alignment features, e.g., in addition to flanged portions, which can similarly act as alignment features for the frame 100. For example, such alignment features may be included on one or more of the flanged portions, and the portions of the frame 100 cooperating with the flanged portions. By way of example, the frame 100 may include a plurality of holes on cooperating components that align with each other to form an alignment aid for assembly/disassembly. Also, or instead, these holes may be structurally configured to serve as a guide for locating a spot weld 170. These holes may also or instead be used otherwise in assembly, mounting, and lifting of the frame 100 or evaporative cooler 101.

As such, the frame 100 may include one or more first holes 171 on each of the flanged bottom 154 and the flanged top 156 of the pair of side channels 150. The first holes 171 may be used as guidance for joining the pair of side channels 150 to each of the bottom panel 112 and the top panel 132—e.g., for locating spot weld 170 placement for attaching these components to form the frame 100. Further, the frame 100 may include one or more second holes 172, which may be structurally configured for alignment with one or more cooperating first holes 171. For example, the frame 100 may include one or more second holes 172 disposed on one or more of the bottom panel 112 and the top panel 132, e.g., where each of the second holes 172 aligns with a cooperating first hole 171 on the side channel 150 for aligning the side channel 150 with one or more of the bottom panel 112 and the top panel 132.

Turning back to FIG. 1, the frame 100 may further include a seal 180 formed between two or more components of the frame 100. For example, the frame 100 may include a seal 180 between the bottom channel 110 and the pair of side channels 150. The seal 180 may be waterproof, which may be especially advantageous when the bottom channel 110 forms or contains a reservoir 116 as described herein. By way of example, the seal 180 may be comprised of one or more of a caulk sealant and a continuous compressible strip. This seal 180 may be disposed continuously along joints formed by engagement of the bottom channel 110 and the side channels 150. A seal 180 may also or instead be disposed between the top channel 130 and the pair of side channels 150, e.g., in the same or similar manner as a seal 180 between the bottom channel 110 and the pair of side channels 150. Thus, in certain implementations, a seal 180 (e.g., a caulk sealant) may be applied substantially continuously along the inner vertical and bottom horizontal joints between the bottom channel 110 and the side channels 150, where this lower portion of the frame 100 may serve as a water reservoir 116. In this manner, water pressure in the reservoir 116 may impose outward pressure on the seal 180, which may force the seal 180 (or sealant) tightly into spot-welded joints, thereby providing an effective and permanent (waterproof) seal 180.

FIG. 2 is an exploded view showing a bottom portion of a frame 100 for an evaporative cooler 101, in accordance with a representative embodiment—the frame 100 may be the same or similar to that shown in FIG. 1. In particular, FIG. 2 shows an exploded perspective view that depicts how the out-turned side channels 150 may facilitate spot-welding, sealing, and holding of the frame 100—e.g., utilizing one or more of the flanged bottom 154, the flanged first side 160, and the flanged second side 162.

As shown in the figure, the bottom channel 110 may have a relatively simple, substantially linear shape with a horizontal bottom panel 112 that terminates with a bottom leading edge 213. Further, each bottom-side panel 114 may similarly terminate with bottom-side leading edges 215. As discussed herein, the bottom channel 110 may also include one or more splash ledges 120, e.g., a front splash ledge with a downturned edge 124 and back splash ledge with a downturned edge 124. The front and back splash ledges 120 may be the same, or they may be slightly different—e.g., one or more of the splash ledges 120 may be specifically configured for collecting drips or retaining a bottom support 104 as shown in FIG. 1, or both. In certain aspects, each splash ledge 120 includes an inclined surface 122 and a downturned edge 124. That is, a surface of the splash ledges 120 may angle slightly upward from its juncture with the bottom-side panel 114, e.g., which can facilitate the return of captured water droplets into the bottom channel 110, which may form a reservoir 116 as described herein.

FIG. 2 shows a side channel 150 above the bottom channel 110, where the side channel 150 is ready for insertion and coupling with the bottom channel 110. As described herein, the side channel 150 may have a vertical side panel 152 with a flanged first side 160 and a flanged second side 162 projecting therefrom. As shown in the figure, one or more of the flanged first side 160 and the flanged second side 162 may include an outward-turned edge 264 that is structurally configured for enveloping at least a portion of the bottom-side leading edges 215 of the bottom-side panels 114. The outward-turned edges 264 may also or instead function as strengthening folds. In certain aspects, the outward-turned edges 264 are substantially aligned with the vertical side panel 152 (i.e., a plane intersecting the vertical side panel 152). In other aspects, the outward-turned edges 264 may include a U-shaped or a hook-shaped feature to aid in enveloping at least a portion of the bottom-side leading edges 215 of the bottom-side panels 114. Such a U-shaped or hook-shaped feature may also or instead be included on the flanged bottom 154, the flanged top 156, or another portion of the frame 100.

In addition to (or instead of) stiffening the flanged first side 160 and the flanged second side 162, the outward-turned edges 264 may serve a valuable function during assembly. For example, as the precisely-made mating parts are placed together for coupling via spot-welding or the like, the outward-turned edges 264 may serve as stops for the bottom-side leading edges 215 and/or the bottom leading edge 213. By way of further example, pushing the bottom-side leading edges 215 relatively tightly against the outward-turned edges 264 and then spot-welding these portions may ensure a desired predetermined alignment, e.g., where substantially right-angle joints between the bottom channel 110 and the side channels 150 are ensured. These right-angle bottom joints may be made before the top corner joints, and may assure a substantially "squared" frame 100 due to the length of contact between the bottom-side leading edges 215 and the outward-turned edges 264.

At a bottom portion thereof, the side channel 150 may also or instead include a flanged bottom 154 as discussed herein. The flanged bottom 154 may have a width approximately equal to the width of flanged sides (e.g., the flanged first side 160 and the flanged second side 162). The flanged bottom 154 may include first holes 171 as discussed herein, e.g., which may be configured to align with second holes 172 on the bottom panel 112. Stated otherwise, the bottom channel 110 may include second holes 172 that are precisely located to mate with the first holes 171 in the out-bent flanged bottom 154 of the side channel 150. Inserting close-fit cylinders, dowels, or the like through the aligned holes may also or instead contribute to accurate assembly of the frame 100. Moreover, bolts, screws, pins, or the like may also or instead be inserted into the aligned holes during assembly of the frame 100.

After full insertion of the side channel 150 into the bottom channel 110, or when these components are otherwise engaged, spot-welds or the like may be made, e.g., at approximately two-inch intervals around the U-shaped joint between the bottom channel 110 and the flanged first side 160, the flanged second side 162, and the flanged bottom 154 of the side channel 150. Next, a seal 180 (see FIG. 1) may be formed using a caulk sealant or the like that may be applied from the inside to make the U-shaped joints substantially watertight. During and after subsequent pre-cooler assembly steps, the aligned holes can be used to secure the base of the frame 100 to wood struts or the like for handling and storage as will be further discussed below with respect to FIG. 4.

FIG. 3 shows an exploded view of a top portion of a frame 100 for an evaporative pre-cooler 101, in accordance with a representative embodiment, where the frame 100 may be the same or similar to that shown in FIGS. 1 and 2. In particular, FIG. 3 shows similar details for the top corners of the frame 100 as FIG. 2 shows for the bottom corners of the frame 100.

As shown in FIG. 3, the top channel 130 may include a top panel 132 that is aligned substantially along a horizontal plane. The top channel 130 may further include top-side panels 134 that extend from the top panel 132. The top-side panels 134 may include downward folds disposed at both the front and the back of the top channel 130. The top channel 130 may terminate in a top leading edge 333, which may be structurally configured for mating with the flanged top 156 of the side channel 150. For example, the top leading edge 333 may include a plurality of second holes 172 configured to align with first holes 171 disposed on the side channel 150.

As further shown in the figure, the top of the side channel 150 may include a flanged top 156, which defines a horizontal flange having a width approximately equal to the width of flanged sides of the side channel 150 (the flanged first side 160 and the flanged second side 162). The flanged top 156 may include the first holes 171, which may be structurally configured to align with the second holes 172 disposed on the top channel 130, i.e., the top leading edge 333 of the top panel 132.

In assembly, the outer ends of the top-side panels 134 (which may be formed of downward folds of material from the top panel 132) may fit tightly against the flanged sides of the side channel 150, and the top leading edge 333 of the top panel 132 may align with the outer edge of the flanged top panel 156 of the side channel 150. The edges of the top-side panels 134 of the top channel 130 may then contact the outward-turned edges 264 of the flanged sides of the side channel 150 (e.g., the outward-turned edges 264 of the flanged first side 160 and the flanged second side 162) for spot welding or the like. By way of example, spot-welds that join the top-side panels 134 and the flanged sides of the side channel 150 may be relatively closely-spaced because of the limited contact area, and spot welds joining the top leading edge 333 of the top channel 130 with the flanged top 156 of the side channel 150 may be spaced similarly to those used at the bottom corners described above with reference to FIG. 2.

Figure 4:
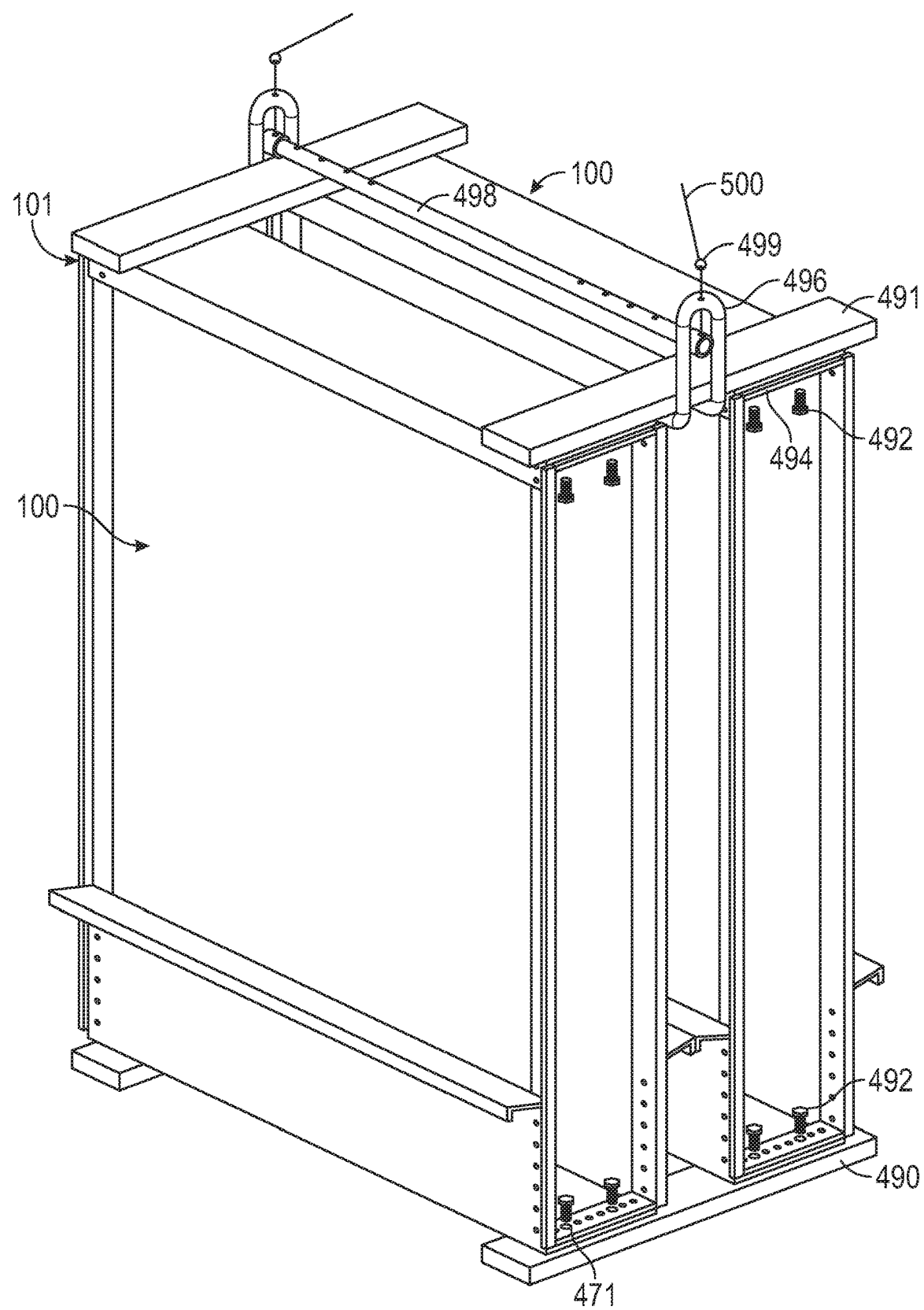
FIG. 4 is a perspective view of a plurality of frames for evaporative pre-coolers configured for transport, in accordance with a representative embodiment.

After assembly of the frame 100, the alignment holes may be used to secure the top of the frame 100 to wood struts or the like for temporary handling and storage, as will be further discussed with respect to FIG. 4. Also, having a "top overhang" may provide a relatively strong corner location, e.g., where lift angles can be placed under such a corner such that a crane or the like can lift one or more units onto a roof without the need of a sling under the bottom of the frame 100, as further discussed with reference to FIG. 4.

FIG. 4 is a perspective view of a plurality of frames 100 for evaporative pre-coolers 101 configured for transport, in accordance with a representative embodiment. The frames 100 may be the same or similar to any of those described herein. Specifically, FIG. 4 shows two frames 100 secured together for being lifted from above. As shown in the figure, the frames 100 may be placed front-to-front in order to protect the visible side of the evaporative media from damage during storage and handling. Temporarily securing two or more units together may have the following advantages: achieves a more stable configuration that is less vulnerable to falling over under forces of wind or impact, both in storage and on roofs, before final attachment to HVAC equipment; reduces handling costs as lifting equipment performs fewer operations by handling multiple units at once; and facilitates stacking of completed units to increase storage density.

FIG. 4 also shows how alignment holes 471 may be used to secure two or more frames 100 to a single, shared bottom strut 490, which may simply be a piece of wood such as a 2"×4" piece of wood. Lag bolts 492 or similar may be driven through the alignment holes 471 and into the into the bottom strut 490, with the two units spaced relatively close together or touching. At the top, a similar, single, shared top strut 491, which may simply be a piece of wood such as a 2"×4" piece of wood, may be placed across the multiple units with lag bolts 492 or the like driven upward through alignment holes 471 and into the top strut 491.

The multiple frames 100 joined at their top and bottom ends by a top strut 491 and a bottom strut 490, respectively, may then be lifted, e.g., in one of two ways, depending on the type of lift. For example, for movement inside a shop or the like, a forklift or the like may be used with forks inserted in the gap at the floor created by elevating the frames 100 upward by the thickness of the bottom struts 490. When the units arrive on a truck or trailer at a building site, where typically they must be lifted for attachment to HVAC equipment on a roof, time can be saved by gripping the multiple unit array under overhanging top edges 494. This strategy may be much faster, both for attachment and release, compared to slinging lift straps under the bottoms of the units. FIG. 4 shows a lift apparatus 496, which may include support fingers or the like that extend under the top corners of the frames 100. The lift apparatus 496 may cooperate with a lift pipe 498 or the like, which can be prepared with various hole sets for different lengths of frames 100. Screw eyes 499 or the like may be inserted into the holes in the lift pipe 498, which can then be attached to a lift line 500, such as a crane's cable, a pulley system, or the like.

In certain aspects, the lift apparatus 496 may include a component with inward turned edges (e.g., to form a hook-like structure) that can be inserted under an overhang component of the frame 100. This can be disposed in a location in-between frames 100 as shown in the figure, or in a location at or near the lag bolts 492. Also, the lift apparatus 496 may be disposed outside of a perimeter of the frames 100, e.g., to allow for stacking or the like. In some aspects, the lift apparatus 496 may include angles with in-turned edges that are welded to a steel plate or the like, where the plate slides along the lift pipe 498 and can be ultimately restrained against outward movement (which could allow a rig to drop the load) by the screw eyes 499 or the like engaged with the lift pipe 498. One end of this plate may be fixed on the lift pipe 498 with its inward angles slid under one end of the frame 100, while another plate is temporarily slid out so its inward angles can drop downward—then the plate slides inward so the angles are under an overhang of the frame 100, where the screw eyes 499 or the like are dropped into the holes on the lift pipe 498 to prevent outward movement of the plate. The frame(s) 100 may then be ready for lifting or other transport.

Thus, in general, described throughout this disclosure are frames for evaporative coolers and pre-coolers. As such, one aspect includes an evaporative pre-cooler including one or more blocks of rigid media, a plate engaging and supporting a bottom end of each of the blocks of rigid media, and a frame containing the blocks of rigid media and the plate. The frame may include a bottom channel including a bottom panel and two bottom-side panels extending upward from the bottom panel, a top channel including a top panel and two top-side panels extending downward from the top panel, and a pair of side channels disposed between, and engaged with, each of the bottom channel and the top channel to form the frame. The side channels may each include a vertical side panel, a flanged bottom and a flanged top disposed opposite one another and each extending outward from the vertical side panel, and a pair of flanged sides disposed opposite one another and each extending outward from the vertical side panel. The flanged bottom of each side channel may be engaged with the bottom panel at an end thereof, the flanged top of each side channel may be engaged with the top panel at an end thereof, and each of the pair of flanged sides of the side channels may be engaged with a bottom-side panel of the bottom channel and a top-side panel of the top channel.

Implementations may include one or more of the following features. The plate may be disposed, at least in part, between the two bottom-side panels. A top portion of each of the two bottom-side panels of the bottom channel may include a splash ledge, where the plate is engaged with the splash ledge of each of the two bottom-side panels. Each splash ledge may include an inclined surface structurally configured to direct liquid toward a bottom surface of the plate. The plate may include one or more perforations providing a fluid path for the liquid to travel from the bottom surface of the plate to the bottom panel of the bottom channel.

In another aspect, the present teachings may include an evaporative cooler framework designed to hold one or more side-by-side blocks of rigid evaporative media, where the framework includes four enclosing channels. The framework may include a bottom channel with a horizontal bottom plane and side planes extending upward from the bottom plane, a top channel with a horizontal top plane and side planes extending downward from the top plane, and mirror-image side channels with orthogonal side, top, and bottom planes extending outward from their vertical center planes. The side channels may make close-tolerance fits inside the ends of the top and bottom channels. The four channels of the framework may be permanently joined by spot-welds along their mating planes at each corner. The joints between the bottom channel and side channels may be sealed by a non-welded means.

Implementations may include one or more of the following features. The sealing means may include caulk that is applied from the interior. The sealing means may include a continuous compressible strip. The sealing means may also be applied between the top channel and side channels. The bottom channel may include low-inwardly-sloping outward-bent planes from its top edges that capture stray moisture droplets from the evaporative media. A perforated horizontal screen may be supported on, and secured to, the inward edges of the outward-bent planes, e.g., to support the evaporative media, stiffen the framework, and allow water to drain downward below the media. The horizontal mating planes at each corner may have aligned holes.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared, or other device or combination of devices. In another aspect, any of the systems and methods described above may be embodied in any suitable transmission or propagation medium carrying computer-executable code and/or any inputs or outputs from same.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings.

Unless the context clearly requires otherwise, throughout the description, the words "comprise," "comprising," "include," "including," and the like are to be construed in an inclusive sense as opposed to an exclusive or exhaustive sense; that is to say, in a sense of "including, but not limited to." Additionally, the words "herein," "hereunder," "above," "below," and words of similar import refer to this application as a whole and not to any particular portions of this application.

It will be appreciated that the devices, systems, and methods described above are set forth by way of example and not of limitation. For example, regarding the methods provided above, absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A frame for an evaporative cooler, comprising:
   a bottom channel including a bottom panel and two bottom-side panels extending upward from the bottom panel;
   a top channel including a top panel and two top-side panels extending downward from the top panel; and
   a pair of side channels disposed between, and engaged with, each of the bottom channel and the top channel to form the frame of the evaporative cooler, the side channels each including:
   a vertical side panel;
   a flanged bottom and a flanged top disposed opposite one another and each extending outward from the vertical side panel; and
   a pair of flanged sides disposed opposite one another and each extending outward from the vertical side panel,
   wherein the flanged bottom of each side channel is engaged with the bottom panel at an end thereof,
   wherein the flanged top of each side channel is engaged with the top panel at an end thereof, and
   wherein each of the pair of flanged sides of the side channels is engaged with a bottom-side panel of the bottom channel and a top-side panel of the top channel, and wherein each of the pair of flanged sides includes an outward-turned edge enveloping at least a portion of one or more of the two bottom-side panels and the two top-side panels.

2. The frame of claim 1, wherein a top portion of each of the two bottom-side panels of the bottom channel includes a splash ledge.

3. The frame of claim 2, wherein each splash ledge includes an inclined surface structurally configured to direct liquid toward the bottom panel.

4. The frame of claim 2, wherein each splash ledge includes downturned edges at a terminal portion thereof.

5. The frame of claim 1, wherein the bottom channel is structurally configured to serve as a water reservoir for the evaporative cooler.

6. The frame of claim 1, further comprising one or more first holes on each of the flanged bottom and the flanged top of the pair of side channels.

7. The frame of claim 6, wherein each of the one or more first holes is structurally configured to serve as a guide for locating a spot weld for joining the pair of side channels to each of the bottom panel and the top panel.

8. The frame of claim 6, further comprising one or more second holes disposed on one or more of the bottom panel and the top panel, each of the one or more second holes aligning with a cooperating first hole on the side channel for aligning the side channel with one or more of the bottom panel and the top panel.

9. The frame of claim 1, further comprising a seal between the bottom channel and the pair of side channels.

10. The frame of claim 9, wherein the seal is waterproof.

11. The frame of claim 9, wherein the seal is comprised of a caulk sealant.

12. The frame of claim 9, wherein the seal is comprised of a continuous compressible strip.

13. The frame of claim 9, wherein the seal is disposed continuously along joints formed by engagement of the bottom channel and the side channels.

14. The frame of claim 1, further comprising a seal between the top channel and the pair of side channels.

15. An evaporative pre-cooler, comprising:
   one or more blocks of rigid media;
   a plate engaging and supporting a bottom end of each of the one or more blocks of rigid media; and
   a frame containing the one or more blocks of rigid media and the plate, the frame comprising:
      a bottom channel including a bottom panel and two bottom-side panels extending upward from the bottom panel;
      a top channel including a top panel and two top-side panels extending downward from the top panel; and
      a pair of side channels disposed between, and engaged with, each of the bottom channel and the top channel to form the frame, the side channels each including:
         a vertical side panel;
         a flanged bottom and a flanged top disposed opposite one another and each extending outward from the vertical side panel; and
         a pair of flanged sides disposed opposite one another and each extending outward from the vertical side panel,
      wherein the flanged bottom of each side channel is engaged with the bottom panel at an end thereof,
      wherein the flanged top of each side channel is engaged with the top panel at an end thereof, and
      wherein each of the pair of flanged sides of the side channels is engaged with a bottom-side panel of the bottom channel and a top-side panel of the top channel, and
      wherein each of the pair of flanged sides includes an outward-turned edge enveloping at least a portion of one or more of the two bottom-side panels and the two top-side panels.

16. The evaporative pre-cooler of claim 15, wherein the plate is disposed, at least in part, between the two bottom-side panels.

17. The evaporative pre-cooler of claim 16, wherein a top portion of each of the two bottom-side panels of the bottom channel includes a splash ledge, and wherein the plate is engaged with the splash ledge of each of the two bottom-side panels.

18. The evaporative pre-cooler of claim 16, wherein each splash ledge includes an inclined surface structurally configured to direct liquid toward a bottom surface of the plate.

19. The evaporative pre-cooler of claim 18, wherein the plate includes one or more perforations providing a fluid path for the liquid to travel from the bottom surface of the plate to the bottom panel of the bottom channel.

20. The evaporative pre-cooler of claim 17, wherein the plate includes a bottom support disposed below edges of the plate that are supported by the splash ledge to collect drips therefrom, the bottom support of the plate engaging and supporting the bottom end of each of the one or more blocks of rigid media.

* * * * *